E. P. MILLER.
MULTIPLE SPINDLE INDEX CENTER.
APPLICATION FILED JUNE 11, 1907.
910,937.  Patented Jan. 26, 1909.
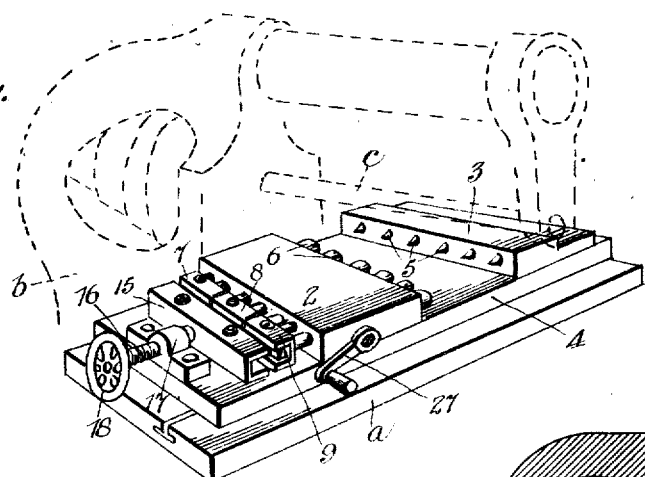
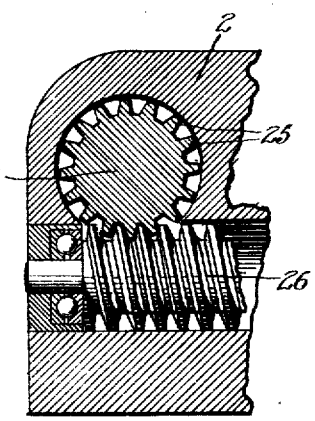
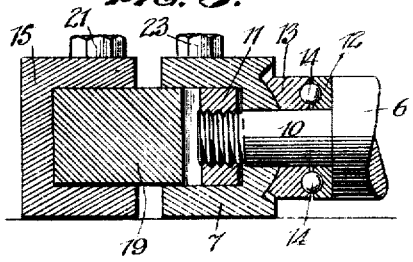
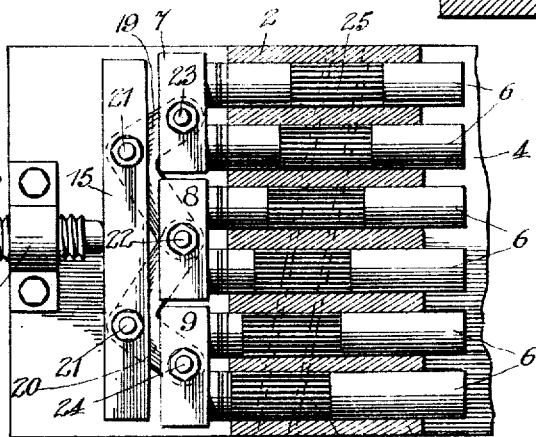
WITNESSES
Chas. K. Davies
Myron G. Cleary
INVENTOR
Ernest P. Miller
By C. L. Parker, Attorney

UNITED STATES PATENT OFFICE.

ERNEST P. MILLER, OF GREENFIELD, MASSACHUSETTS.

MULTIPLE-SPINDLE INDEX-CENTER.

No. 910,937.　　　　Specification of Letters Patent.　　　Patented Jan. 26, 1909.

Application filed June 11, 1907. Serial No. 378,449.

*To all whom it may concern:*

Be it known that I, ERNEST P. MILLER, a citizen of the United States, residing at Greenfield, in the county of Franklin and State of Massachusetts, have invented a new and Improved Labor-Saving Multiple-Spindle Index-Center, of which the following is a specification.

My invention relates to index centers as ordinarily used in connection with milling machines, and more particularly to a device embodying a plurality of centers adapted to clamp a plurality of pieces of work of the same or varying lengths, and the object thereof is to provide such a construction, together with means whereby the plurality of pieces of work may be simultaneously indexed.

Further objects and advantages of my invention will appear in the course of the following description in which reference is made to the accompanying drawing, forming a part of this specification, in which like numerals are used to designate like parts throughout the several figures, and in which, Figure 1 is a perspective view of my improved device in its operative position upon a milling machine. Fig. 2 is a horizontal sectional view through the head stock adjacent one end thereof, broken away and showing the mechanism therein in plan. Fig. 3 is an enlarged vertical sectional view taken through one end of the indexing spindles, and through the equalizing mechanism, and Fig. 4 is an enlarged transverse vertical sectional view taken through a portion of the head stock and through one of the indexing spindles, and illustrating the connection of the indexing screw therewith.

In the practical embodiment of my invention, I provide a frame comprising spaced head and tail stocks 2 and 3 respectively, mounted adjacent the forward and rear ends respectively of a bed plate 4, so termed by reason of its adaptability to be secured upon the bed plate $a$ of a milling machine $b$, having a cutter shaft $c$, projecting transversely above said body plate 4 between said head and tail stocks 2 and 3. The head stock 3 is provided with a horizontal short series of stationary centers 5, while the head stock 2 is provided with a series of horizontal openings adapted for the reception therethrough of a plurality of indexing spindles 6, each of which is in alinement with one of said centers 5 of the tail stock 3. It will thus be understood that the work desired to be milled, is clamped between the end of one of the indexing spindles 6 and its correspondingly alined center 5, thus allowing for the operation upon as many pieces of work as there are spindles 6, a cutter for each piece of work being carried upon the cutter shaft $c$, of the milling machine $b$. At their outer ends, the indexing spindles 6 are connected between pairs by a series of equalizing levers 7, 8, and 9, said equalizing levers comprising channel bars into which the reduced ends 10 of the said spindles 6 project and are provided therein with nuts 11, threadedly engaging thereon to prevent the withdrawal of the same.

The reduced ends 10, of the spindles 6, provide shoulders at their juncture with said spindles which shoulders are provided with circular boring collars 12, surrounding said reduced ends 10, and abut similar collars 13 provided with a concave surface for contact with a substantially enlarged convex surface of the said equalizing levers, as shown in Fig. 3, said collars 12 and 13 being provided with semicircular grooves in their abutting faces adapted for the reception of anti-friction balls 14. Thus by the engagement of the concave and convex surfaces as just described, the spindles 6 are permitted slight angular movement with relation to the equalizing levers 7, 8, and 9, the nuts 11 of the reduced ends 10 of said spindles being loose enough to permit of such slight angular movement, and being circular to allow of the rotation of said spindles. Mounted adjacent and parallel to said equalizing levers 7, 8, and 9, and of a length equal to the combined length thereof, is an equalizing bar 15 upon the opposite side of which an adjusting screw bar 16, threadedly engaging through a bracket 17, mounted upon the forward end of the bed plate 4, projects centrally thereagainst, and is provided with a circular handle 18 upon its outer end by which the same may be rotated toward and away from said equalizing bar 15. The bar 15 is connected to the equalizing levers 7, 8, and 9 by a pair of L-shaped links 19 and 20, both of which are pivotally secured by bolts 21 at their point of angle, to said equalizing bar 15 at points in alinement between the equalizing levers 7, 8, and 9 respectively. The inner extremities of said connecting links 19 and 20 are pivotally secured together and to the central equalizing lever 8, by a bolt 22, at a point thereon in alinement between its pair of spindles 6, while the outer end of the connecting link 19 is pivotally secured by a bolt 23 to the equalizing lever 7, at a point thereon in alinement between its pair of spindles 6, and the outer end of the connecting link 20 is pivotally connected by a bolt 24 to the equalizing lever 9 at a point thereon in alinement between its pair of spindles 6.

From the foregoing it will be seen that should any of the pieces of material to be clamped between the inner ends of the spindle 6 and the centers 5, be shorter or longer than the others, the inequality will be taken up by the equalizing bar 15, equalizing levers 7, 8, and 9, and through connecting links 19 and 20, when the adjusting screw bar 16 is rotated inwardly against the equalizing bar 15 to force the said spindle 6 longitudinally and toward the centers 5.

In order that the spindles 6 may be simultaneously indexed without interfering with the longitudinal movement thereof, I provide said spindles with peripheral longitudinally extending teeth 25, which may extend the entire length thereof, or only partially the length thereof, as shown in Fig. 2. I further provide the head stock 2 with an opening extending therethrough transversely of the said spindles 6, and mount therein a worm shaft 26 engaging with its spiral teeth, the teeth 25 of the said spindles 6, said worm shaft being arranged at such an angle thereto as to cause the rotation of said spindles upon its own rotation, while allowing said spindles to move longitudinally and independently thereof. Thus it will be seen that after equal or unequal longitudinal movement of the spindle 6, the same may be rotated to index the work by means of the worm shaft 26, constituting the index bar and provided with a handle 27 at one end thereof by which the same may be operated.

Having fully described my invention, I claim:

In a multiple spindle index center, the combination of a plurality of centers, a plurality of longitudinally movable indexing spindles provided with circumferential teeth extending longitudinally thereof, and an indexing screw for engagement with said circumferential teeth and mounted at such an angle to said spindles as to allow of the longitudinal movement thereof, substantially as described.

ERNEST P. MILLER.

Witnesses:
   FRANCIS K. CROWNINGSHIELD,
   GEORGE PIERCE.